(No Model.)
G. B. PRESCOTT, Jr.
DISTRIBUTION OF ELECTRICITY BY SECONDARY BATTERIES.
No. 402,190. Patented Apr. 30, 1889.
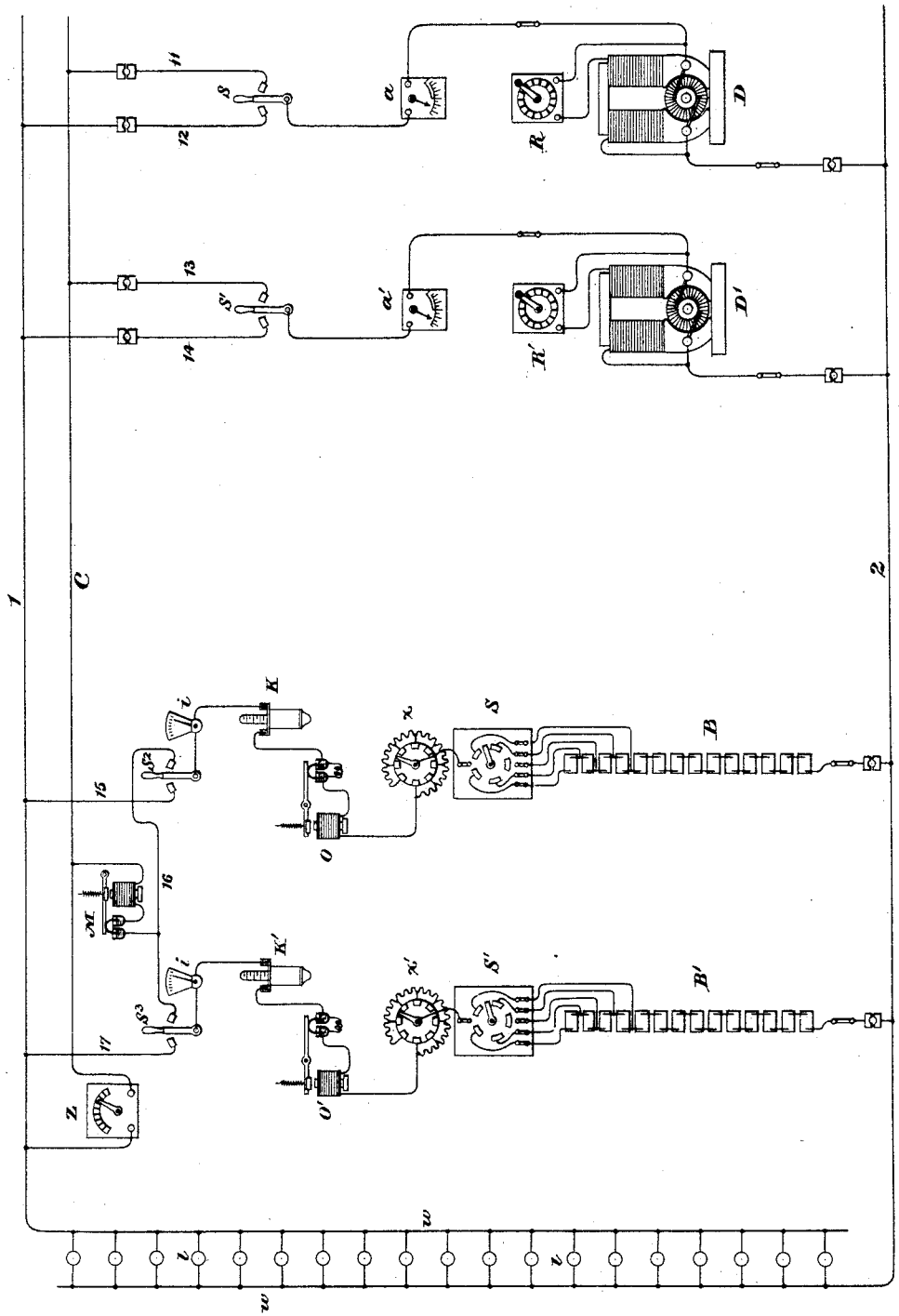
Witnesses.
Geo. W. Breck.
Carrie E. Ashley.
Inventor,
George B. Prescott Jr.
By his Attorney

UNITED STATES PATENT OFFICE.

GEORGE B. PRESCOTT, JR., OF NEWARK, NEW JERSEY, ASSIGNOR TO THE ELECTRICAL ACCUMULATOR COMPANY, OF NEW YORK.

DISTRIBUTION OF ELECTRICITY BY SECONDARY BATTERIES.

SPECIFICATION forming part of Letters Patent No. 402,190, dated April 30, 1889.

Application filed February 7, 1889. Serial No. 298,975. (No model.)

*To all whom it may concern:*

Be it known that I, GEORGE B. PRESCOTT, Jr., a citizen of the United States, and a resident of Newark, in the county of Essex and State of New Jersey, have invented certain new and useful Improvements in Distribution of Electricity by Secondary Batteries, of which the following is a specification.

My invention relates to the distribution of electricity through the medium of secondary batteries or accumulators.

The invention consists in an arrangement of one or more dynamos in parallel circuit with one or more series of cells of secondary battery and a working-circuit containing translating devices to be supplied from either or both such sources of electrical energy.

The accompanying drawing illustrates my invention.

D D' are dynamo-electric machines supplied with regulating devices R R'. One terminal of each dynamo is connected to the main lead 2. The second terminal of either or both may be connected with the main lead 1 or an auxiliary lead, C, by operating the hand-switches $s$ or $s'$.

$w$ is a working-circuit containing lamps 1, connected with the main leads 1 and 2 at points outside the point of connection between the auxiliary lead C and main lead 1.

In auxiliary lead C is placed an adjustable resistance, Z.

B and B' are two series of cells of secondary battery equal in number. One terminal of each series is connected to the main lead 2. Switches $s^2$ and $s^3$ are arranged to furnish connection between the second terminal of each series of cells and either main lead 1 or auxiliary lead C. Between switches $s^2$ and $s^3$ in a circuit common to the circuit of both and to auxiliary lead C there is an automatic circuit-breaker, M, operating to divide said circuit upon a change in the direction of current or upon a failure of such current. Between each series of cells and its switch $s^2$ or $s^3$ there is a switch, S, for varying the number of cells in the series, an adjustable artificial resistance, $x$ or $x'$, an overdischarge-switch, O or O', a voltmeter, K, and an instrument, $i$, for indicating the direction in which current is flowing.

I will assume that normally one or both dynamos D D' are connected with the main leads 1 and 2 and are supplying lamps 1 in the working-circuit $w$. If more current is shown to be passing through ammeter $a$ than is utilized at the lamps 1, I may connect a series of cells with the dynamo to receive a current of charge. To charge this series of cells, which in number are sufficient to supply a counter electro-motive force equal to that due to the dynamo, I must raise the electro-motive force of the dynamo, say, one-half volt for every cell of battery; but this would be injurious to the lamps. I therefore connect the dynamo and battery to auxiliary lead C, breaking the normal connection with lead 1, and I adjust the artificial resistance Z to an amount sufficient to produce a drop in the electro-motive force manifest at the lamp-terminals to the normal point. By moving switch $s^3$, I may connect a second series of cells, B', in parallel with the first and with the dynamos, for the purpose of charging. After the batteries are charged I disconnect the dynamos, and, by changing the switches $s^2 s^3$, I connect the batteries with main lead 1, having no artificial resistance to cause a drop in the electro-motive force. By the use of this arrangement of apparatus the batteries may be connected to the dynamos for charging or to the working-circuit for discharging by simply changing their connections from the main lead 1 to the auxiliary lead C.

The adjustable artificial resistances $x$ and $x'$, each in circuit with a battery, are for varying the current flowing in or out of the battery branch circuit with which it is connected. This is useful and necessary when two or more series of batteries are connected in parallel circuit, because otherwise the electro-motive force or internal resistance of one series varying slightly from that of the other would result injuriously to the battery having a lower electro-motive force. The resistances are used to regulate for fractional parts of the unit of change—*i. e.*, two volts—which unit of change is produced by operating the switches S or S'.

By the arrangement of apparatus shown and described the operations of a lighting-plant are simplified, and errors in connections or the proportioning of current are rendered as remote as possible, even when under the control of unskilled labor.

What I claim, and desire to secure by Letters Patent, is—

1. The combination of a dynamo-electric machine, two main leads therefor, a working-circuit containing lamps, one or more series of cells of secondary battery, an auxiliary lead containing an artificial resistance, and switches for changing the batteries and dynamos from one lead to the other for the purpose of charging and discharging, substantially as described.

2. The combination of two or more dynamo-electric machines connected in multiple arc, main leads therefor, a working-circuit containing lamps in multiple arc, two or more series of cells of secondary battery in parallel circuit, with their opposite terminals connected to the main leads, respectively, whereby both dynamos and batteries supply the working-circuit, a switch in each battery branch for varying the number of cells in circuit, and a switch in each dynamo branch to connect and disconnect either dynamo with respect to the main leads, substantially as described.

3. The combination of a dynamo-electric machine, main leads therefor, two or more series of cells of secondary battery connected in parallel circuit with each other, and an adjustable artificial resistance in circuit with each battery to compensate for fractional differences in the electro-motive force between each series, substantially as described.

GEORGE B. PRESCOTT, JR.

Witnesses:
DANIEL E. DELAVAN,
V. E. SCHAUMBURG.